(12) United States Patent
Yoshida et al.

(10) Patent No.: US 6,331,747 B2
(45) Date of Patent: Dec. 18, 2001

(54) SURFACE ACOUSTIC WAVE MOTOR AND APPARATUS HAVING THE SAME

(75) Inventors: Ryuichi Yoshida, Sakai; Yasuhiro Okamoto, Tondabayashi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/784,515

(22) Filed: Feb. 15, 2001

(30) Foreign Application Priority Data

Feb. 23, 2000 (JP) .................................................. 12-045475

(51) Int. Cl.$^7$ .................................................. H01L 41/08
(52) U.S. Cl. ................ 310/313 R; 310/323.02; 310/328
(58) Field of Search ........................... 310/313 R, 328, 310/323.02

(56) References Cited

U.S. PATENT DOCUMENTS

| | | | |
|---|---|---|---|
| 5,006,749 | * 4/1991 | White | 310/323.02 |
| 5,633,554 | 5/1997 | Kaji | 310/328 |
| 5,805,743 | 9/1998 | Iwamoto | 385/7 |

FOREIGN PATENT DOCUMENTS

| | | |
|---|---|---|
| 07-231685 A | 8/1995 | (JP) . |
| 09-233865 A | 9/1997 | (JP) . |
| 11-146665 A | 5/1999 | (JP) . |

\* cited by examiner

*Primary Examiner*—Mark O. Budd
(74) *Attorney, Agent, or Firm*—Sidley Austin Brown & Wood

(57) ABSTRACT

A surface acoustic wave motor with high energy efficiency, which may efficiently execute recovery of energy of surface acoustic waves propagated to the ends of piezoelectric substrate and re-excitation by the recovered energy, includes a comb-shaped electrode having interdigital structure for generating surface acoustic waves and two unindirectional comb-shaped electrodes having interdigital structure for recovering and re-exciting surface acoustic wave energy arranged on a piezoekextric substrate, and a slider disposed between the comb-shaped electrode for generating surface acoustic waves and the unindirectional comb-shaped electrodes for recovering and re-exciting surface acoustic wave energy. The surface acoustic wave generated by the comb-shaped electrode is recovered as electric power by unindirectional comb-shaped electrode arranged at one end of the piezoelectric substrate, and applied to the unindirectional comb-shaped electrode arranged at the other end thereof to re-excite the piezoelectric substrate.

14 Claims, 9 Drawing Sheets

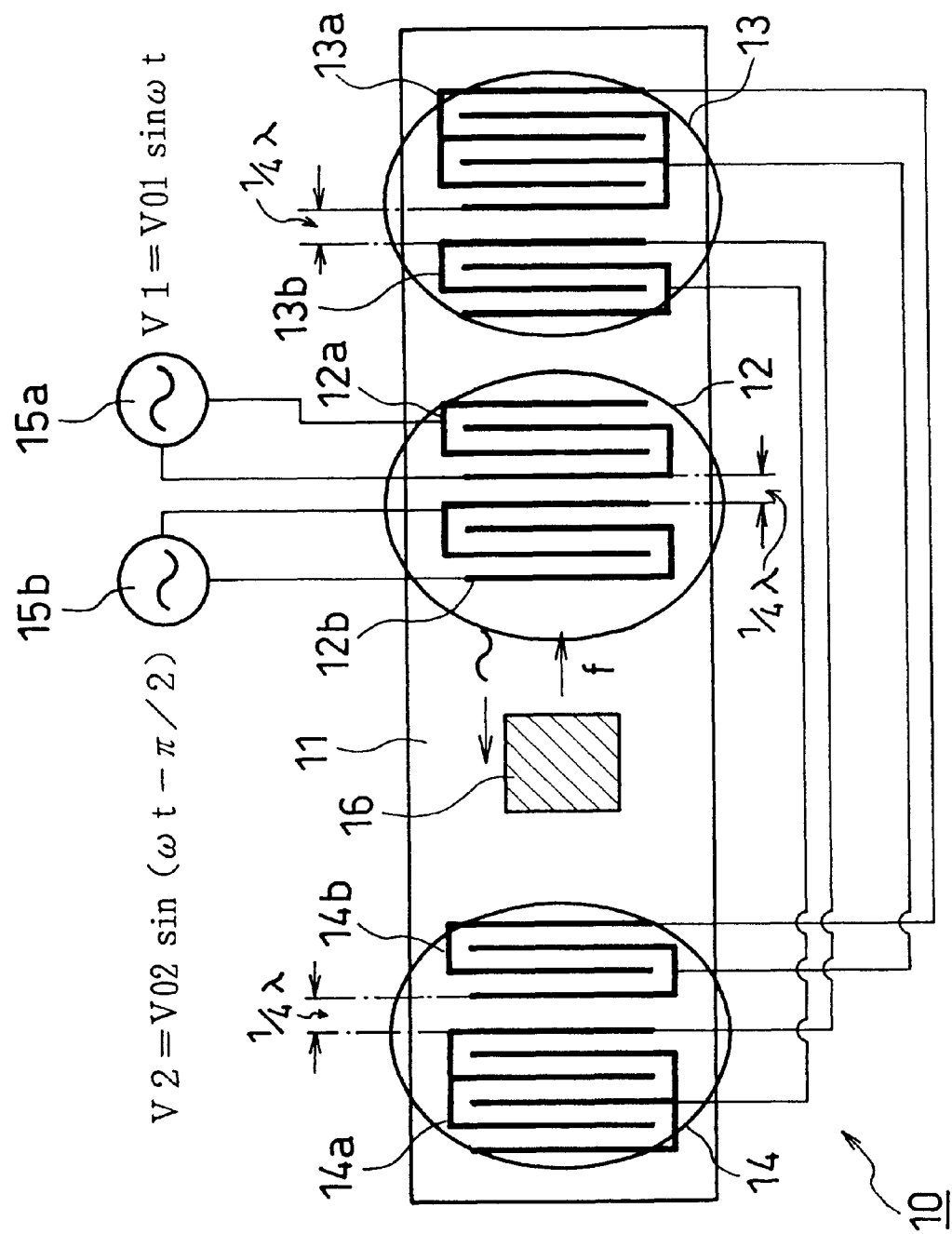

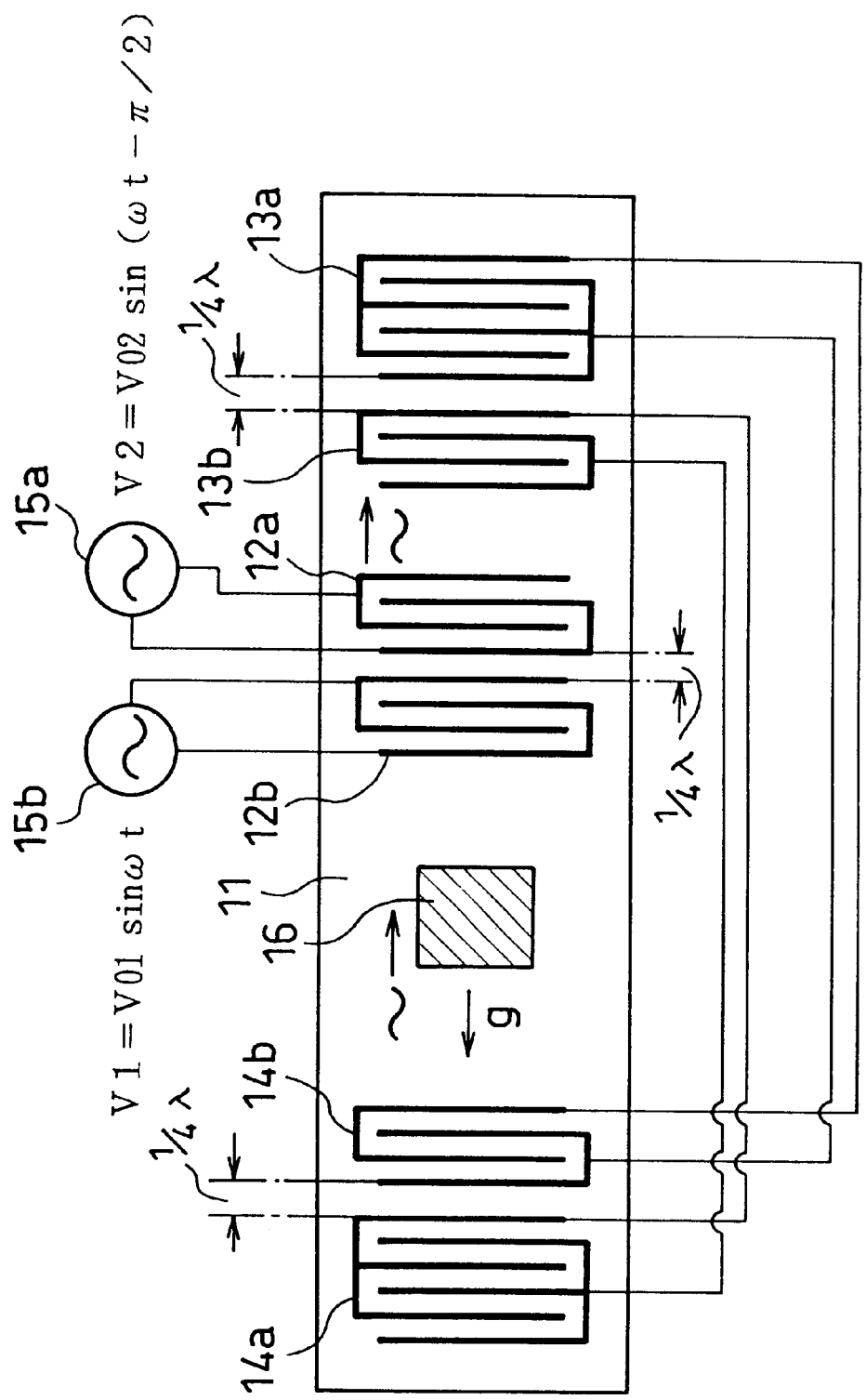

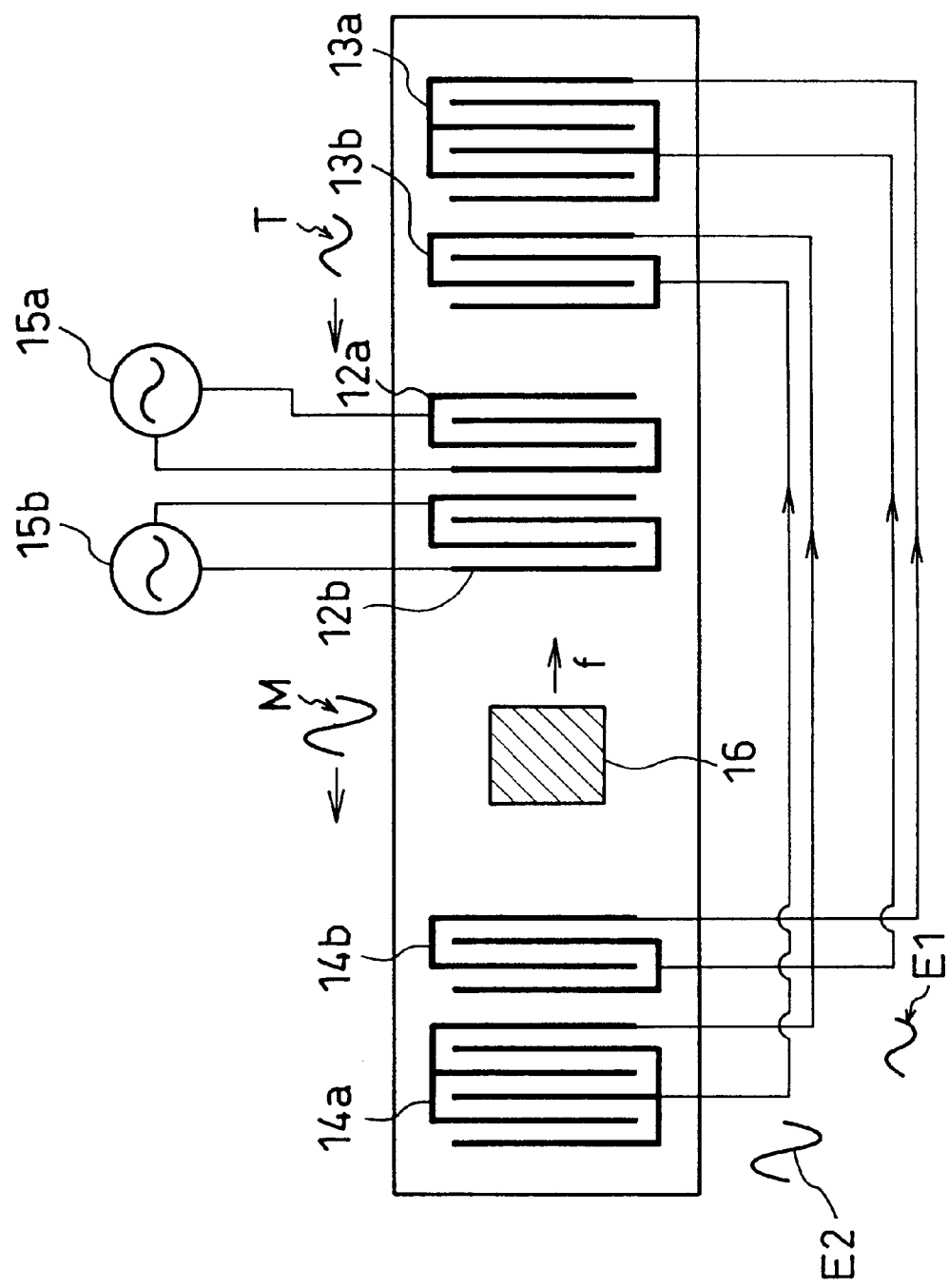

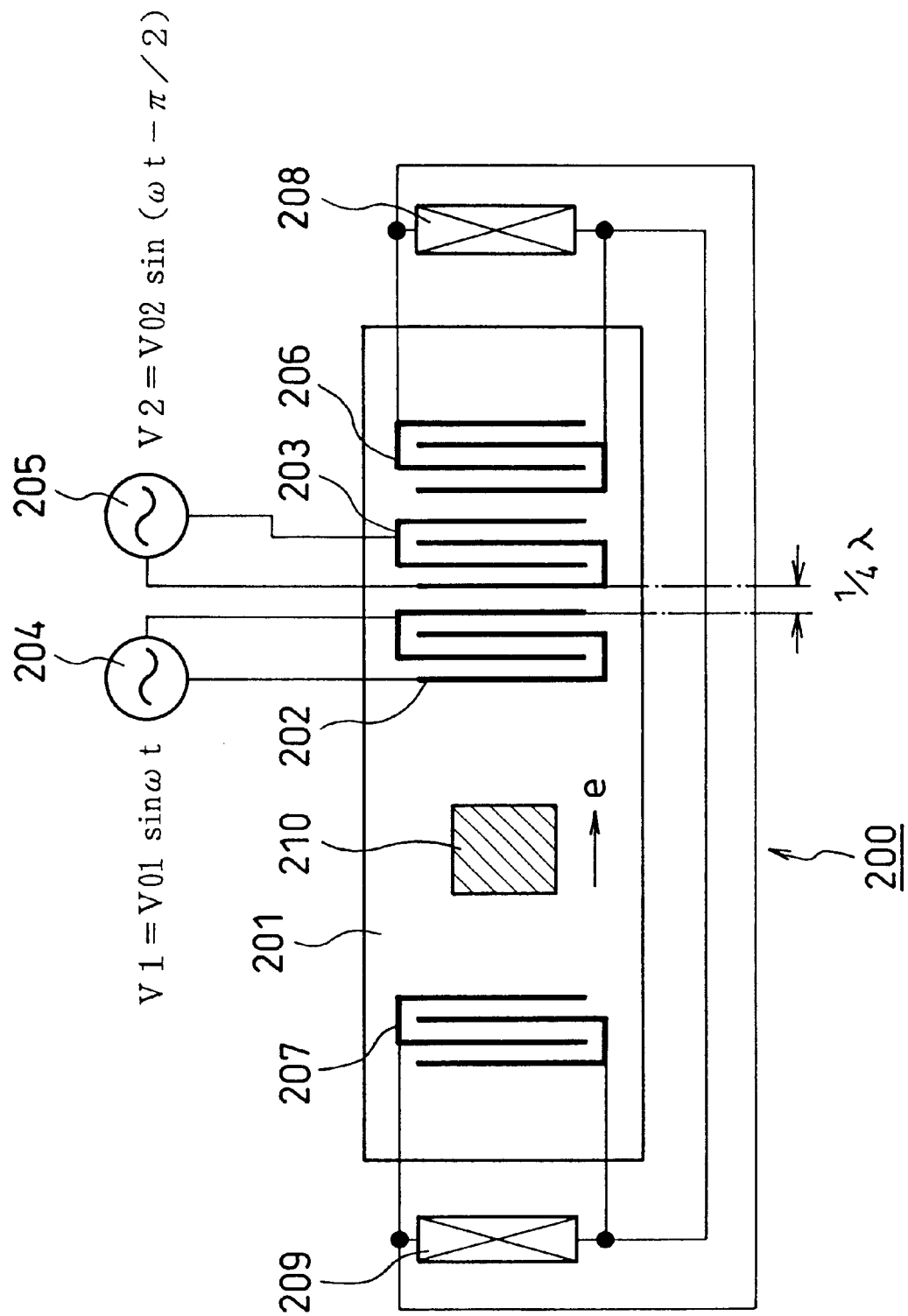

SURFACE ACOUSTIC WAVE MOTOR AND APPARATUS HAVING THE SAME

This application is based on Pat. Application No. 2000-45475 filed in Japan, the contents of which are hereby incorporated by reference.

BACKGROUND OF THE INVENTION

1. Field of the Invention

This invention relates to a surface acoustic wave motor using the traveling wave of surface acoustic waves excited on a piezoelectric substrate.

2. Prior Art

An actuator using an electric motor has been used heretofore for driving a photographing lens of a camera, but the disadvantages such as an increase in size of an apparatus, the generation of a magnetic field, the generation of noise and the like have been pointed out. As a means for overcoming the disadvantages, recently an ultrasonic motor has been proposed, which is adapted to take out the mechanical vibration generated by an ultrasonic vibrator mainly through the frictional force and convert the same into the rectilinear motion or the rotary motion. Further as a motor for enabling the precise drive control, it has been proposed that the motor use a traveling wave of surface acoustic waves (See Japanese Patent Laid-Open No. 07-231685, Japanese Patent Laid-Open No. 09-233865).

The constitution and driving principle of a surface acoustic wave motor will now be described with reference to FIGS. 6 and 7. FIG. 6 is a plan view showing the basic configuration of the surface acoustic wave motor, and FIG. 7 is a side view thereof.

In FIGS. 6 and 7, a surface acoustic wave motor 100 is so constructed that a comb-shaped electrode having interdigital structure 102 is disposed on a piezoelectric substrate 101 which is a substrate formed of piezoelectric material such as piezoelectric ceramic material mainly composed of PZT ($PbZrO_3.PbTiO_3$), and connected to a high frequency power supply 103.

Vibration absorbers 107, 108 are arranged at the ends of the piezoelectric substrate 101. These are intended to absorb surface acoustic wave vibration reaching the ends of the piezoelectric substrate 101 so that a standing wave is not generated in the piezoelectric substrate.

When the comb-shaped electrode having interdigital structure 102 is excited by the high frequency power supply 103, surface acoustic waves (Rayleigh waves) L1, L2 vibrating backwardly elliptically are generated on the right and on the left of the comb-shaped electrode having interdigital structure 102 in the piezoelectric substrate 101, and respectively travel in the direction of going away from the comb-shaped electrode having interdigital structure 102. That is, the surface acoustic wave L1 travels in the direction of an arrow (a), and the surface acoustic wave L2 travels in the direction of an arrow (b) (the opposite direction to the arrow (a)).

A solid state slider 109 placed on the piezoelectric substrate 101 gets on the crest of the surface acoustic wave L1 or L2 vibrating backwardly elliptically, so that it is moved in the direction of approaching the comb-shaped electrode having interdigital structure 102 which is the opposite direction to the traveling directions of the surface acoustic waves L1 and L2. That is, as shown in FIG. 7, when the slider 109 gets on the crest of the surface acoustic wave L1, it is moved in the direction of an arrow (C).

When the slider 109 reaches a position striding over the comb-shaped electrode having interdigital structure 102, the slider 109 gets on the crests of the surface acoustic waves L1 and L2 traveling in the opposite directions to each other so that the slider cannot be moved in either direction. Accordingly, in the configurations shown in FIGS. 6 and 7, the slider 109 is capable of moving in only one direction.

For application to a general driving mechanism such as the movement of a lens of a camera, it is necessary to be able move on one axis in both directions. Therefore, it has been proposed to construct a surface acoustic wave motor adapted to move a slider in a designated direction by arranging two comb-shaped electrodes having interdigital structure on a piezoelectric substrate and driving one of the comb-shaped electrodes having interdigital structure.

FIG. 8 is a perspective view showing the basic construction of a surface acoustic wave motor in which two comb-shaped electrodes having interdigital structure are arranged on a piezoelectric substrate, and FIG. 9 is its plan view.

In FIGS. 8 and 9, a surface acoustic wave motor 120 is so constructed that a first comb-shaped electrode having interdigital structure 102 and a second comb-shaped electrode having interdigital structure 104 are arranged on a piezoelectric substrate 101 and respectively connected to a first high frequency power supply 103 and a second high frequency power supply source 105. A slider 109 is arranged between the first comb-shaped electrode having interdigital structure 102 and the second comb-shaped electrode having interdigital structure 104. Vibration absorbers 107, 108 are arranged at the ends of the piezoelectric substrate 101.

In this arrangement, in the case of moving the slider 109 in the direction of an arrow (d) (See FIGS. 8 and 9), the first comb-shaped electrode having interdigital structure 102 is excited by the high frequency power supply 103 to generate a surface acoustic wave propagated to the left (in the opposite direction to the arrow (d)). Thus, the slider 109 can be moved toward the first comb-shaped electrode having interdigital structure 102 (in the direction of an arrow (d)).

In the case of moving the slider 109 in the opposite direction of the arrow (d), the second comb-shaped electrode having interdigital structure 104 is excited by the high frequency power supply 105 to generate a surface acoustic wave propagated to the right in FIGS. 8 and 9, thereby achieving the movement.

Though the thus constructed surface acoustic wave motor has high driving speed and is excellent in responsiveness, the energy efficiency is very low. This is because most of the surface acoustic wave energy is not used for moving the slider, but is absorbed in the ends of the piezoelectric substrate.

That is, since in the thus constructed surface acoustic wave motor, vibration absorbers are disposed at the ends of the piezoelectric substrate so as not to generate a standing wave in the piezoelectric substrate, most of surface acoustic wave energy generated on the piezoelectric substrate is absorbed in the vibration absorbers, resulting in the disadvantages that the generation of heat is large so that continuous driving is difficult and very large driving power is needed.

As a countermeasure, an energy recovery type surface acoustic wave motor has been proposed, which is so constructed that the surface acoustic wave energy generated in the piezoelectric substrate to reach the ends thereof is not absorbed in the vibration absorbers at the ends of the piezoelectric substrate, but the energy is recovered to be circulated (See Japanese Patent Laid-Open No. 11-146665).

FIG. 10 is a plan view for explaining an example of construction of an energy recovery type surface acoustic wave motor 200, in which a first comb-shaped electrode having interdigital structure 202 and a second comb-shaped electrode having interdigital structure 203 for generating surface acoustic waves are disposed at a spacing of 1/4 λ of the wavelength λ of the generated surface acoustic wave on a piezoelectric substrate 201, and respectively connected to a first high frequency power supply 204 and a second high frequency power supply 205.

In addition to the above, a third comb-shaped electrode having interdigital structure 206 and a fourth comb-shaped electrode having interdigital structure 207 which are provided with an inductance for recovering surface acoustic wave energy and re-exciting the surface acoustic wave are disposed on the piezoelectric substrate 201.

The piezoelectric substrate and the third comb-shaped electrode having interdigital structure 206 and the fourth comb-shaped electrode having interdigital structure 207 disposed thereon constitute an electromechanical transducer element, which functions as a mechanical-electric transducer element for converting the mechanical vibration into the high frequency electric power when the surface acoustic wave propagated on the piezoelectric substrate is received, and also functions as an electromechanical transducer element for converting the high frequency electric power into the surface acoustic wave power which is mechanical vibration when the high frequency electric power is input.

An inductance 208 is connected in parallel to the third comb-shaped electrode having interdigital structure 206, and an inductance 209 is connected in parallel to the fourth comb-shaped electrode having interdigital structure 207. These inductances are provided for restraining reflection of the surface acoustic waves propagated on the piezoelectric substrate and re-exciting the same.

A slider 210 is disposed between the first comb-shaped electrode having interdigital structure 202 and the fourth comb-shaped electrode having interdigital structure 207.

In this arrangement, the phase of high frequency voltage applied to the first comb-shaped electrode having interdigital structure 202 and the second comb-shaped electrode having interdigital structure 203 is shifted to control the traveling direction of generated surface elastic waves.

In this arrangement, at the time of moving the slider 210 to the right (in the direction of an arrow (e) in FIG. 10, it will be sufficient to generate the surface elastic wave toward the left (in the opposite direction to the arrow (e))

First, voltage, $V1 = V01 \cdot \sin(\omega t)$, is applied from the high frequency power supply 204 to the first comb-shaped electrode having interdigital structure 202, and voltage $V2 = V02 \cdot \sin(\omega t - \pi/2)$, is applied from the high frequency power supply 205 to the second comb-shaped electrode having interdigital structure 203 to drive the second comb-shaped electrode having interdigital structure 203 with a phase difference of π/2 to the first comb-shaped electrode having interdigital structure 202.

On the piezoelectric substrate 201, surface acoustic waves heading toward the left (in the opposite direction to the arrow (e)) in FIG. 10 are generated, and the surface acoustic waves propagated on the piezoelectric substrate 201 are converted into the high frequency electric power by the fourth comb-shaped electrode having interdigital structure 207. The converted high frequency electric power is circulated and applied to the third comb-shaped electrode having interdigital structure 206, and again converted to the surface acoustic waves heading toward the left (in the opposite direction to the arrow (e)) to excite the piezoelectric substrate 201. Thus, the slider 210 can be moved toward the right (in the direction of the arrow (e)) in FIG. 10.

At the time of moving the slider 210 to the left (in the opposite direction to the arrow (e)) in FIG. 10, it will be sufficient to generate the surface acoustic waves toward the right (in the direction of the arrow (e)) in FIG. 10.

First, voltage, $V1 = V01 \cdot \sin(\omega t - \pi/2)$, is applied from the high frequency power supply 204 to the first comb-shaped electrode having interdigital structure 202, and voltage, $V2 = V02 \cdot \sin(\omega t)$, is applied from the high frequency power supply 205 to the second comb-shaped electrode having interdigital structure 203 to drive the electrode.

On the piezoelectric substrate 201, surface acoustic waves heading toward the right (in the direction of the arrow (e)) in FIG. 10 are generated, and the surface acoustic waves propagated on the piezoelectric substrate 201 are converted into the high frequency electric vibration by the third comb-shaped electrode having interdigital structure 206. The converted high frequency electric vibration is circulated and applied to the fourth comb-shaped electrode having interdigital structure 207, and again converted into the surface acoustic waves heading toward the right (in the direction of the arrow (e)) to excite the piezoelectric substrate 201. Thus, the slider 210 can be moved toward the left (in the opposite direction to the arrow (e)) in FIG. 10.

Thus, the surface acoustic waves propagated on the piezoelectric substrate to one end thereof are recovered by the comb-shaped electrode having interdigital structure disposed at one end of the piezoelectric substrate, and circulated to the comb-shaped electrode having interdigital structure disposed at the other end of the piezoelectric substrate to re-excite the piezoelectric substrate, so that the energy efficiency can be heightened.

In the energy recovery-type surface acoustic wave motor, in addition to the ordinary surface acoustic wave generating comb-shaped electrode having interdigital structure, there are provided two comb-shaped electrodes having interdigital structure to which an inductance is connected in parallel, whereby the surface acoustic waves propagated on the piezoelectric substrate to the end are recovered by one comb-shaped electrode having interdigital structure, and circulated to the other comb-shaped electrode having interdigital structure. This arrangement, however, has the disadvantages that even if the optimum value of inductance is selected, actually it is difficult to hold down the reflection of surface acoustic waves at the ends of the piezoelectric substrate, and further when the recovered surface acoustic wave energy is again emitted from the other comb-shaped electrode having interdigital structure, the energy is emitted from both ends of the comb-shaped electrode having interdigital structure so that an energy loss is caused, and the improvement in energy efficiency has its limit.

SUMMARY OF THE INVENTION

The present invention has been made in view of the above circumstances and it is a major object of the present invention to provide a new surface acoustic wave motor having a high energy efficiency.

It is another object of the present invention to provide a surface acoustic wave motor having a high energy efficiency, which may efficiently recover the energy of surface acoustic waves propagated to the end of a surface acoustic wave element and re-excite the surface acoustic wave element by the recovered energy.

It is still another object of the present invention to provide a device including the surface acoustic wave motor having a high energy efficiency.

Other objects of the present invention will be made clear by the detailed description of the invention referring to the drawings.

BRIEF DESCRIPTION OF THE DRAWINGS

FIG. 1 is a plan view showing the basic construction of a surface acoustic wave motor according to an embodiment of the invention (in the case of moving a slider toward the right);

FIG. 2 is a plan view showing the basic construction of the surface acoustic wave motor shown in FIG. 1 (in the case of moving the slider toward the left);

FIG. 5 is a diagram for explaining the operation of the whole including re-excitation of the surface acoustic wave motor;

FIG. 10 is a plan view showing the construction of the conventional energy recovery type surface acoustic wave motor.

DETAILED DESCRIPTION OF THE PREFERRED EMBODIMENTS

Figure 3A:
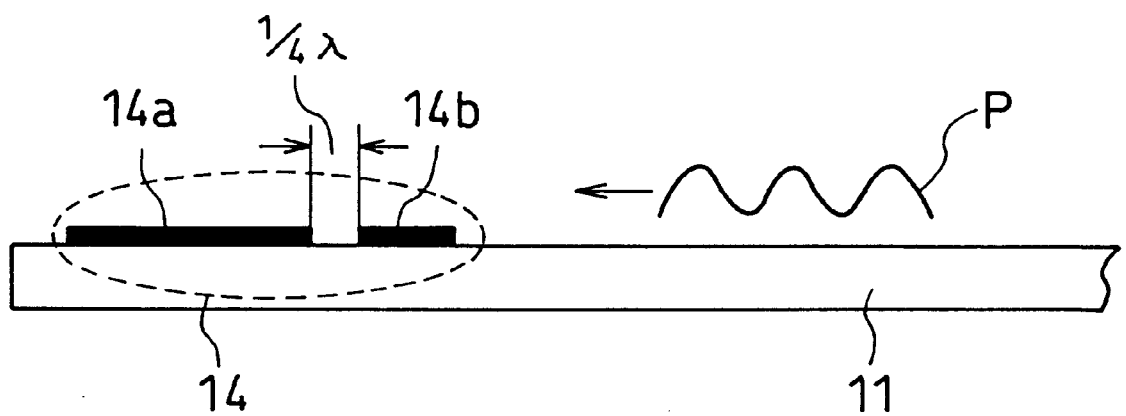
FIGS. 3(a), 3(b), 3(c) and 3(d) are diagrams for explaining the condition of reflection of surface acoustic waves at unidirectional comb-shaped electrodes having interdigital structure.

The embodiments of the invention will now be described. FIG. 1 is a plan view showing the basic construction of a surface acoustic wave motor 10 according to an embodiment of the invention.

In FIG. 1, the reference numeral 11 is a piezoelectric substrate constituting a surface acoustic wave element, in which $LiNbO_3$ is used as piezoelectric ceramic material.

A comb-shaped electrode having interdigital structure 12 for generating surface acoustic waves and unidirectional comb-shaped electrodes having interdigital structure 13 and 14 for recovering the surface acoustic wave energy and re-excitation are arranged on the piezoelectric substrate 11, and a slider 16 is arranged between the surface acoustic wave generating comb-shaped electrode having interdigital structure 12 and the unidirectional comb-shaped electrode having interdigital structure 14.

The comb-shaped electrode having interdigital structure 12 is formed by electrodes 12a and 12b arranged at a spacing of 1/4 of the wavelength λ of the surface acoustic wave. The electrodes 12a and 12b are respectively formed by plural pairs, ten pairs in the embodiment, the electrode 12a is connected to a high frequency power supply 15a, and the electrode 12b is connected to a high frequency power supply 15b. In FIG. 1, the electrode 12a and the electrode 12b are respectively shown in only two pairs to avoid complicatedness of the drawing.

On the other hand, the unidirectional comb-shaped electrode having interdigital structure 13 is formed by a first electrode 13a and a second electrode 13b arranged at a spacing of 1/4 of the wavelength λ of the surface acoustic wave, and the unidirectional comb-shaped electrode having interdigital structure 14 is formed by a third electrode 14a and a fourth electrode 14b arranged at a spacing of 1/4 of the wavelength λ of the surface acoustic wave.

The second electrode 13b and the fourth electrode 14b closer to the comb-shaped electrode having interdigital structure 12 are respectively formed by plural pairs, five pairs in the embodiment, and the unidirectional first electrode 13a and the third electrode 14a farther away from the comb-shaped electrode having interdigital structure 12 are respectively formed by plural pairs, fifteen pairs in the embodiment. In FIG. 1, the second electrode 13b and the fourth electrode 14b are respectively shown in only two pairs, and the first electrode 13a and the third electrode 14a are respectively shown in only three pairs to avoid complicatedness of the drawing.

The first electrode 13a and the fourth electrode 14b are electrically connected to each other, and the second electrode 13b and the third electrode 14a are electrically connected to each other.

Further, the second electrode 13b is disposed (n+1/4) λ (wavelength) from the electrode 12b, and the fourth electrode 14b is disposed (m+1/4) λ (wavelength) from the electrode 12a.

In this arrangement, in the case of moving the slider 16 toward the right (in the direction of an arrow (f)) in FIG. 1, it will be sufficient to generate the surface acoustic wave toward the left (in the opposite direction to the arrow (f))

First, voltage, $V1 = V01 \cdot \sin(\omega t)$, is applied from a high frequency power supply 15a to the electrode 12a of the comb-shape delectrode having interdigital structure 12, and voltage $V2 = V02 \cdot \sin(\omega t - \pi/2)$, is applied from a high frequency power supply 15b to the electrode 12b of the comb-shaped electrode having interdigital structure 12 (See FIG. 1).

Provided that V01, V02 are high frequency voltage.

On the piezoelectric substrate 11, surface acoustic waves heading toward the left (in the opposite direction to the arrow (f)) in FIG. 1 are generated, and the surface acoustic waves propagated on the piezoelectric substrate 11 are converted into the high frequency electric power by the fourth electrode 14b and the third electrode 14a. The high frequency electric power converted by the fourth electrode 14b is circulated to the first electrode 13a, and the high frequency electric power converted by the third electrode 14a is circulated to the second electrode 13b and again converted into the surface acoustic wave heading toward the left (in the opposite direction to the arrow (f)) to excite the piezoelectric substrate 11. Thus, the slider 16 can be moved toward the right (in the direction of an arrow (f)) in FIG. 1.

At this time, as described above, on the side where the slider 16 is arranged, the electrodes 12a and 12b of the comb-shaped electrode having interdigital structure 12 are arranged at a spacing of 1/4 of the wavelength λ of the surface acoustic wave, so that the phase difference between the phase of the surface acoustic wave propagated from the electrode 12a toward the left and the phase of the surface acoustic wave propagated from the electrode 12b toward the left becomes 0 (zero), so the surface acoustic wave is strengthened.

On the other hand, on the side where the slider 16 is not arranged, the phase difference between the phase of the surface acoustic wave propagated from the electrode 12a toward the right and the phase of the surface acoustic wave propagated from the electrode 12b toward the right is π, so that both waves cancel each other, so the surface acoustic wave is weakened.

The high frequency voltages V01, V02 generated from the high frequency power supplies 15a, 15b are adjusted to equalize the amplitude of the surface acoustic wave on the side where the slider 16 is not arranged, whereby they are made to completely cancel each other to restrain a loss of energy.

FIG. 2 shows the case of moving the slider 16 toward the left (in the direction of an arrow (g), that is, in the opposite direction to the arrow (f) in FIG. 1), and voltage, $$V2 = V02 \cdot \sin(\omega t - \pi/2),$$

is applied from a high frequency power supply 15a to the electrode 12a of the comb-shaped electrode having interdigital structure 12, and voltage $$V1 = V01 \cdot \sin(\omega t)$$

is applied from a high frequency power supply 15b to the electrode 12b of the comb-shaped electrode having interdigital structure 12.

On the piezoelectric substrate 11, surface acoustic waves heading toward the right (in the opposite direction to the arrow (g)) in FIG. 2 are generated, and the surface acoustic waves propagated on the piezoelectric substrate 11 are converted into the high frequency electric power by the second electrode 13b and the first electrode 13a. The high frequency electric power converted by the second electrode 13b is circulated to the third electrode 14a, and the high frequency electric power converted by the third electrode 14a is circulated to the second electrode 13b and again converted into the surface acoustic wave heading toward the right (in the opposite direction to the arrow (g)) to excite the piezoelectric substrate 11. Thus, the slider 16 can be moved toward the left (in the direction of an arrow (g) in FIG. 2.

At this time, as described above, on the side where the slider 16 is arranged, the electrodes 12a and 12b of the comb-shaped electrode having interdigital structure 12 are arranged at a spacing of 1/4 of the wavelength λ of the surface acoustic wave, so that the phase difference between the phase of the surface acoustic wave propagated from the electrode 12a toward the right and the phase of the surface acoustic wave propagated from the electrode 12b toward the right becomes 0 (zero), so the surface acoustic wave is strengthened.

On the other hand, on the side where the slider 16 is not arranged, the phase difference between the phase of the surface acoustic wave propagated from the electrode 12a toward the right and the phase of the surface acoustic wave propagated from the electrode 12b toward the right is π, so that both waves cancel each other, so the surface acoustic wave is weakened.

The high frequency voltage V01, V02 generated from the high frequency power supplies 15a, 15b are adjusted to equalize the amplitude of the surface acoustic wave on the side where the slider 16 is not arranged, whereby they are made to completely cancel each other to restrain a loss of energy.

FIGS. 3(a) to 3(d) are diagrams for explaining the condition of reflection of surface acoustic waves at the third electrode 14a and the fourth electrode 14b of the unidirectional comb-shaped electrode having interdigital structure 14.

Figure 3B:
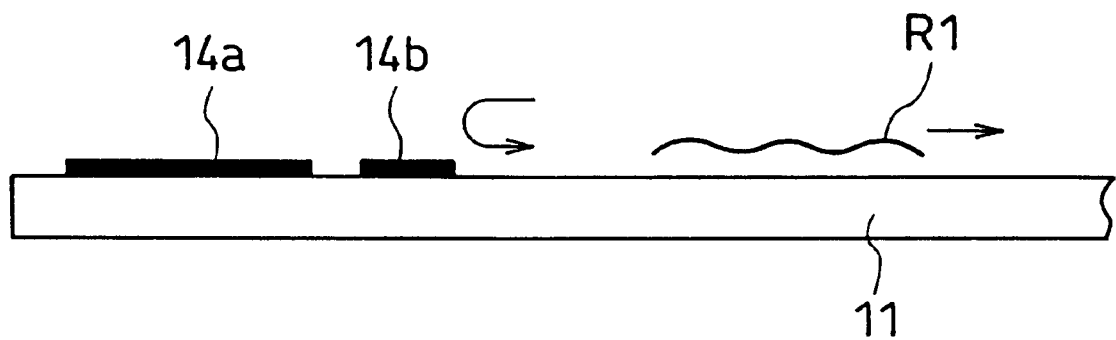
Figure 3C:
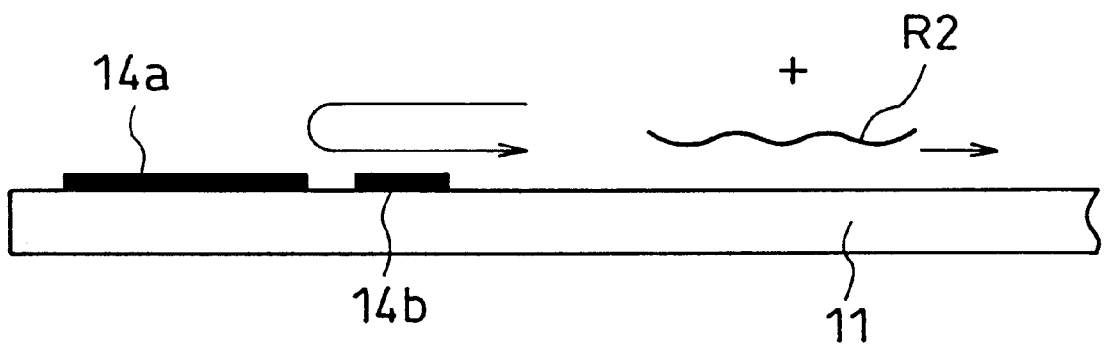
Figure 3D:
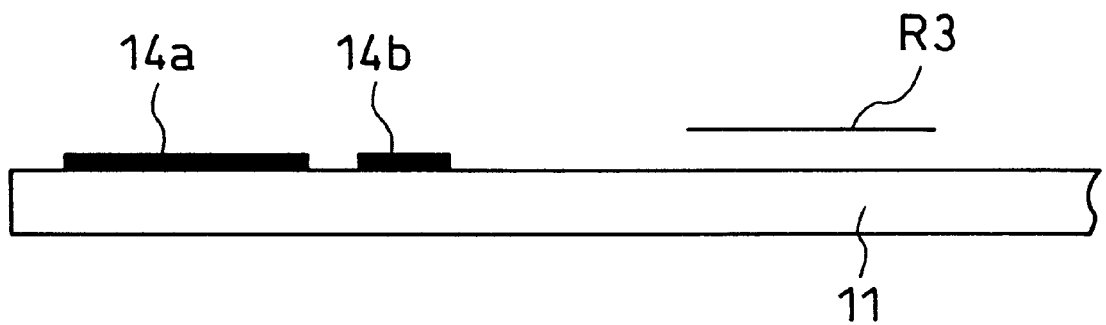

As shown in FIG. 3(a), the surface acoustic wave P propagated on the piezoelectric substrate 11 from the right to the left in FIG. 3 is, first, as shown in FIG. 3(b), reflected from the fourth electrode 14b to travel as the reflected wave R1 toward the right. Further, the surface acoustic wave P passed through the fourth electrode 14b is, as shown in FIG. 3(c), reflected from the third electrode 14a to travel as the reflected wave R2 toward the right. The space between the third electrode 14a and the fourth electrode 14b is 1/4 λ, so that the phase difference between two reflected waves is π. Thus, the reflected waves R1 and R2 of the surface acoustic waves are composed to cancel each other, and as shown in FIG. 3(d), the composed reflected wave R3 disappears.

As the reflected wave R2 from the third electrode 14a is the reflected wave of the surface acoustic wave passed through the fourth electrode 14b, in order to make the surface acoustic wave P easily pass through the fourth electrode 14b, the number of pairs of the fourth electrodes 14b is made smaller than the number of pairs of the third electrodes 14a. Though there are provided five pairs of the fourth electrodes 14b and fifteen pairs of the third electrodes 14a in this embodiment, the proper number of pairs for mutually canceling the reflected waves is determined depending on the electromechanical coupling factor of the piezoelectric substrate.

Figure 4A:
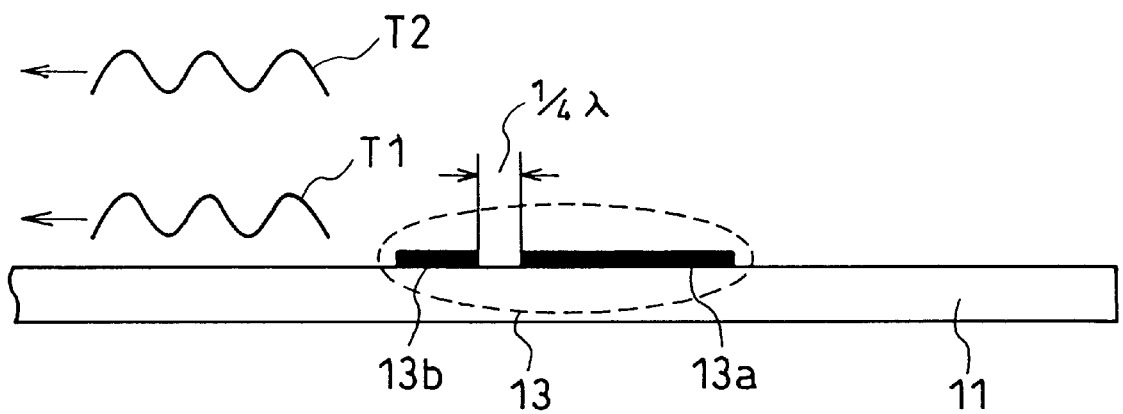
FIGS. 4(a) and 4(b) are diagrams for explaining the condition of re-excitation of surface acoustic waves at unidirectional comb-shaped electrodes having interdigital structure.
Figure 4B:
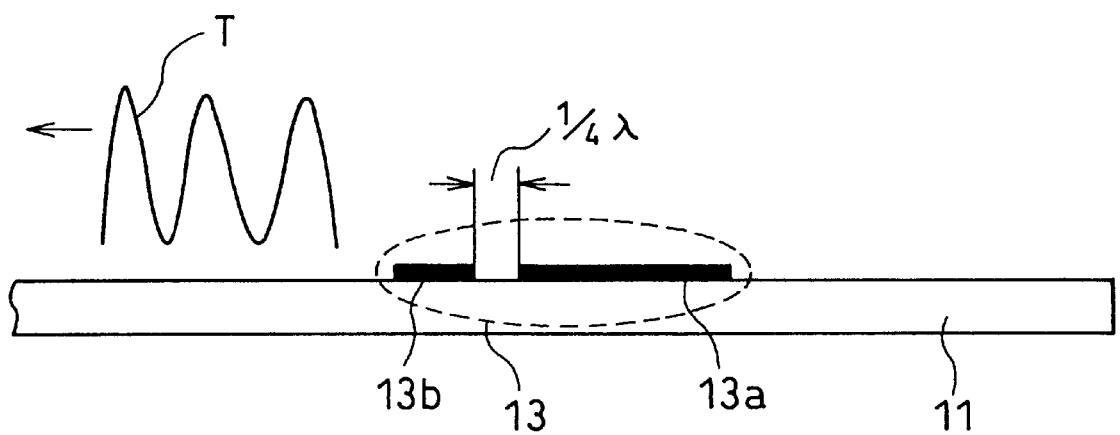
Figure 6:
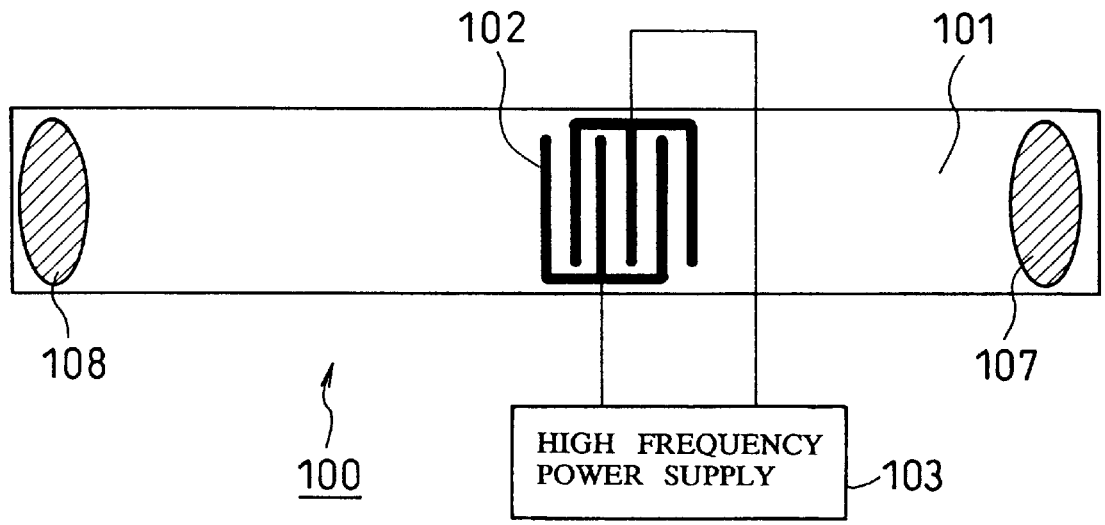
FIG. 6 is a plan view showing the basic construction of the conventional surface acoustic wave motor.
Figure 7:
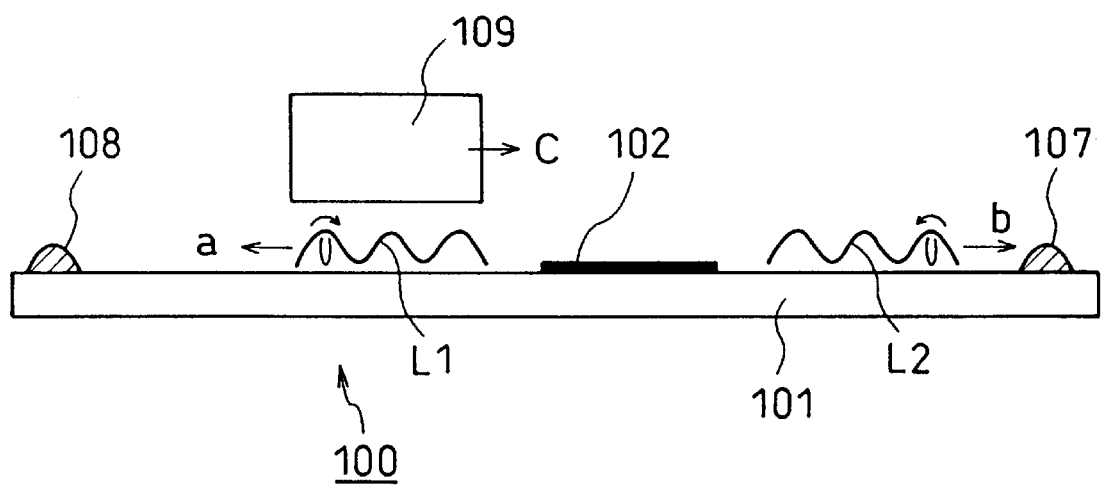
FIG. 7 is a side view of the conventional surface acoustic wave motor shown in FIG. 6.
Figure 8:
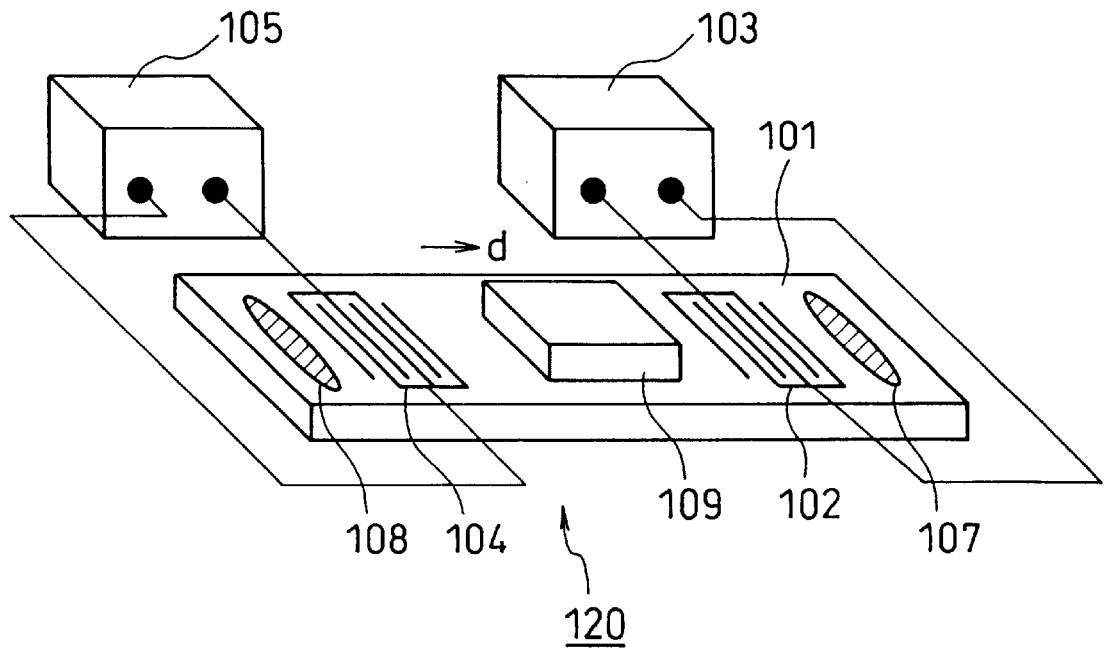
FIG. 8 is a perspective view showing the basic construction of the conventional surface acoustic wave motor where two comb-shaped electrodes having interdigital structure are arranged on a piezoelectric substrate.
Figure 9:
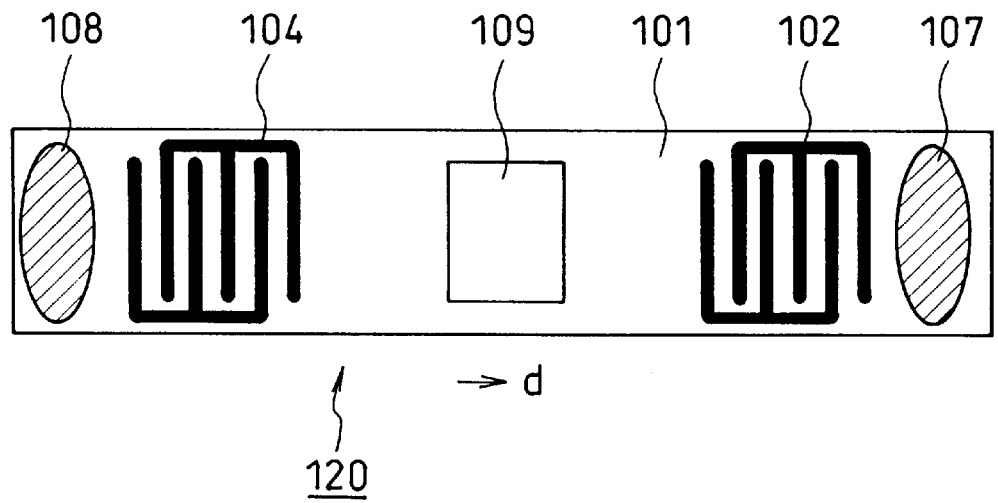
FIG. 9 is a plan view of the conventional surface acoustic wave motor where two comb-shaped electrodes having interdigital structure are arranged on a piezoelectric substrate shown in FIG. 8.

FIGS. 4(a) and 4(b) are diagrams for explaining the condition of re-excitation of the surface acoustic waves by the first electrode 13a and the second electrode 13b of the unidirectional comb-shaped electrode having interdigital structure 13, and FIG. 5 is a diagram for explaining the whole operation including re-excitation of the surface acoustic wave motor.

The condition of re-excitation of the surface acoustic wave by the unidirectional comb-shaped electrode having interdigital structure and the whole operation including re-excitation of the surface acoustic wave motor will now be described with reference to FIGS. 4(a) and 4(b) and FIG. 5.

As described before, the first electrode 13a is connected to the fourth electrode 14b, and the second electrode 13b is connected to the third electrode 14a.

Among the surface acoustic waves M propagated on the piezoelectric substrate 11 from the right toward the left in FIGS. 4 and 5, the surface acoustic wave received by the fourth electrode 14b is converted into high frequency electric power E1 (See FIG. 5), input to the first electrode 13a, and again converted into the surface acoustic wave T1 propagated from the right toward the left to excite the piezoelectric substrate 11.

Among the surface acoustic waves M propagated on the piezoelectric substrate 11 from the right toward the left in FIGS. 4 and 5, the surface acoustic wave received by the fourth electrode 14a is converted into high frequency electric power E2 (See FIG. 5), input to the second electrode 13b, and again converted into the surface acoustic wave T2 to excite the piezoelectric substrate 11.

At this time, the spacing between the third electrode 14a and the fourth electrode 14b is 1/4 $\lambda$, and also the spacing between the first electrode 13a and the second electrode 13b is 1/4 $\lambda$, so that there is no phase difference between the surface acoustic waves T1 and T2. The surface acoustic waves T1 and T2 are composed to be strengthened to excite the piezoelectric substrate 11 as the surface acoustic wave T with a large amplitude (see FIGS. 4(a) and 4(b)). This excitation and the excitation of the piezoelectric substrate 11 by the surface acoustic wave M generated by the comb-shaped electrode having interdigital structure 12 (the electrode 12a and the electrode 12b) are composed to move the slider 16 in the direction of the arrow (f).

According to the invention, as described above in detail, the surface acoustic wave motor may efficiently execute recovery of the surface acoustic wave energy propagated to the end of the surface acoustic wave element and re-excitation of the surface acoustic wave element by the recovered energy, and reflection of the surface acoustic wave at the ends of the surface acoustic wave element is held down so that the energy is efficiently recovered and re-excited without an element member such as inductance or the like by the construction and configuration of the comb-shaped electrodes having interdigital structure for recovering and re-exciting the energy to provide the surface acoustic wave motor with high energy efficiency.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A surface acoustic wave motor, comprising:
    a substrate which is formed of piezoelectric material capable of propagating a surface acoustic wave with a wavelength $\lambda$;
    a first comb-shaped electrode having interdigital structure for recovery and re-excitation, which is a unidirectional comb-shaped electrode having interdigital structure arranged at one end of the substrate, and not connected to an external power supply, said first comb-shaped electrode having interdigital structure including a first electrode and a second electrode arranged outside the first electrode on the substrate, said first electrode and the second electrode being arranged at a spacing of $\lambda/4$;
    a second comb-shaped electrode having interdigital structure for recovery and re-excitation, which is a unidirectional comb-shaped electrode having interdigital structure arranged at the other end of the substrate and not connected to an external power supply, said second comb-shaped electrode having interdigital structure including a third electrode and a fourth electrode arranged outside the third electrode on the substrate, said third electrode and the fourth electrode being arranged at a spacing of $\lambda/4$;
    a comb-shaped electrode having interdigital structure for generating surface acoustic waves, which is arranged between the first and second comb-shaped electrodes having interdigital structure for recovery and re-excitation, connected to an external high frequency power supply, and capable of generating surface acoustic waves with a wavelength $\lambda$ toward both ends of the substrate in the substrate; and
    connecting parts for electrically connecting the first electrode and the fourth electrode to each other, and the second electrode and the third electrode to each other.

2. A surface acoustic wave motor according to claim 1, wherein the first electrode to the fourth electrode are respectively formed by plural pairs of comb-shaped electrodes having interdigital structure, and the number of pairs of the first electrode and the third electrode is larger than the number of pairs of the second electrode and the fourth electrode.

3. A surface acoustic wave motor according to claim 1, wherein the surface acoustic waves which have reached the first and second comb-shaped electrodes having interdigital structure for recovery and re-excitation from the comb-shaped electrode having interdigital structure for generating a surface acoustic wave are recovered in the respective comb-shaped electrodes having interdigital structure for recovery and re-excitation, applied as electric power to the other comb-shaped electrode having interdigital structure for recovery and re-excitation, and again radiated as the surface acoustic waves traveling in the same direction.

4. A surface acoustic wave motor according to claim 1, wherein the piezoelectric material for forming the substrate is piezoelectric ceramic.

5. A surface acoustic wave motor according to claim 1, wherein the comb-shaped electrode having interdigital structure for generating the surface acoustic waves includes a fifth electrode and a sixth electrode.

6. A surface acoustic wave motor according to claim 5, wherein the fifth electrode and the sixth electrode are arranged at a spacing of $\lambda/4$.

7. A surface acoustic wave motor according to claim 5, wherein voltages of waveforms having a phase difference of $\pi/2$ are respectively applied to the fifth electrode and the sixth electrode from the high frequency power supply.

8. An apparatus, comprising:
    a substrate which is formed of piezoelectric material capable of propagating a surface acoustic wave with a wavelength $\lambda$;
    a slider arranged on the substrate;
    a first comb-shaped electrode having interdigital structure for recovery and re-excitation which is a unidirectional comb-shaped electrode having interdigital structure arranged at one end of the substrate, and not connected to an external power supply, said first comb-shaped electrode having interdigital structure including a first electrode and a second electrode arranged outside the first electrode on the substrate, said first electrode and the second electrode being arranged at a spacing of $\lambda/4$;
    a second comb-shaped electrode having interdigital structure for recovery and re-excitation, which is a unidirectional comb-shaped electrode having interdigital structure arranged at the other end of the substrate and not connected to an external power supply, said second comb-shaped electrode having interdigital structure including a third electrode and a fourth electrode arranged outside the third electrode on the substrate, said third electrode and the fourth electrode being arranged at a spacing of $\lambda/4$;
    a comb-shaped electrode having interdigital structure for generating surface acoustic waves, which is arranged between the first and second comb-shaped electrodes having interdigital structure for recovery and re-excitation, and capable of generating a surface acoustic wave with a wavelength λ toward both ends of the substrate on the substrate;

a high frequency power supply device which is connected to the comb-shaped electrode having interdigital structure for generating surface acoustic waves and adapted to apply voltage to the comb-shaped electrode having interdigital structure for generating surface acoustic waves; and connecting parts for electrically connecting the first electrode and the fourth electrode to each other, and the second electrode and the third electrode to each other.

9. An apparatus according to claim 8, wherein the first electrode to the fourth electrode are respectively formed by plural pairs of comb-shaped electrodes having interdigital structure, and the number of pairs of the first electrode and the third electrode is larger than the number of pairs of the second electrode and the fourth electrode.

10. An apparatus according to claim 8, wherein the surface acoustic waves which have reached the first and second comb-shaped electrodes having interdigital structure for recovery and re-excitation from the comb-shaped electrode having interdigital structure for generating surface acoustic waves are recovered by the respective comb-shaped electrodes having interdigital structure for recovery and re-excitation, applied as electric power to the other comb-shaped electrode having interdigital structure for recovery and re-excitation and again radiated as the surface acoustic waves traveling in the same direction.

11. An apparatus according to claim 8, wherein the piezoelectric material for forming the substrate is a piezoelectric ceramics.

12. An apparatus according to claim 8, wherein the comb-shaped electrode having interdigital structure for generating surface acoustic waves includes a fifth electrode and a sixth electrode.

13. An apparatus according to claim 12, wherein the fifth electrode and the sixth electrode are arranged at a spacing of λ/4.

14. An apparatus according to claim 12, wherein the high frequency power supply device comprises a high frequency power supply device connected to the fifth electrode, and a high frequency power supply device connected to the sixth electrode; and wherein voltages of waveforms having a phase difference of π/2 are respectively applied to the fifth electrode and the sixth electrode from the high frequency power supply devices corresponding to the fifth electrode and the sixth electrode.

* * * * *

UNITED STATES PATENT AND TRADEMARK OFFICE
CERTIFICATE OF CORRECTION

PATENT NO. : 6,331,747 B2
DATED : December 18, 2001
INVENTOR(S) : Ryuichi Yoshida et al.

It is certified that error appears in the above-identified patent and that said Letters Patent is hereby corrected as shown below:

Title page,
ABSTRACT,
Line 6, delete "unindirectional", and insert -- unidirectional --.
Line 9, delete "piezoekextric", and insert -- piezoelectric --.
Line 11, delete "unindirectional", and insert -- unidirectional --.
Lines 14 and 15, delete "unindirectional", and insert -- unidirectional --.
Line 16, delete "unindirectional", and insert -- unidirectional --.

Column 1,
Line 24, after "Further", insert -- , --.
Line 49, after "L2" insert -- , --.
Line 50, after "elliptically", insert -- , --.

Column 2,
Line 9, after "able", insert -- to --.
Line 55, after "of", insert -- the --.

Column 3,
Lines 6 and 7, delete "1/4 λ of the wavelength λ", and insert -- ¼ of the wavelength λ --.
Line 48, after "(e))", insert -- . --.
Line 55, after "voltage", insert -- , --.

Column 6,
Line 47, after "(f))", insert -- . --.
Line 53, delete "comb-shape delectrode", and insert -- comb-shaped electrode --.
Line 54, after "voltage", insert -- , --.

Column 7,
Line 38, after "voltage", insert -- , --.
Line 40, after "V1=V01 · sin (ωt)", insert -- , --.

Column 8,
Line 8, delete "voltage", and insert -- voltages --.

Column 10,
Line 27, after "is", insert -- a --.

UNITED STATES PATENT AND TRADEMARK OFFICE
CERTIFICATE OF CORRECTION

PATENT NO. : 6,331,747 B2
DATED : December 18, 2001
INVENTOR(S) : Ryuichi Yoshida et al.

It is certified that error appears in the above-identified patent and that said Letters Patent is hereby corrected as shown below:

Column 12,
Line 7, delete "ceramics", and insert -- ceramic --.

Signed and Sealed this

Eleventh Day of June, 2002

Attest:

JAMES E. ROGAN
Attesting Officer          Director of the United States Patent and Trademark Office